UNITED STATES PATENT OFFICE.

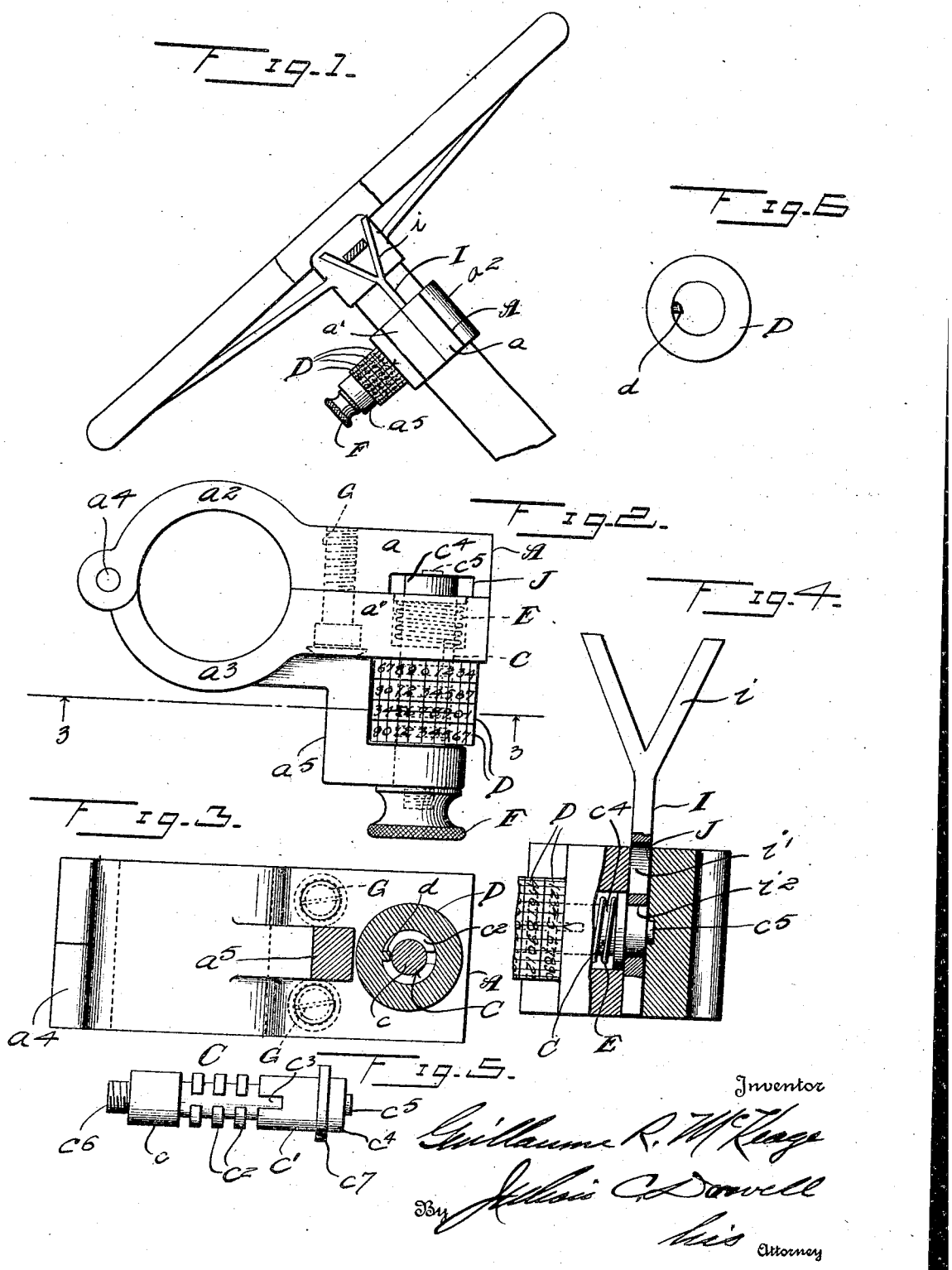

GUILLAUME REUSEUS McKEAGE, OF MONTROSE, PENNSYLVANIA.

AUTOMOBILE LOCK.

1,414,991.  Specification of Letters Patent.  Patented May 2, 1922.

Application filed July 1, 1919. Serial No. 307,895.

*To all whom it may concern:*

Be it known that I, GUILLAUME R. MC-KEAGE, a citizen of the United States, residing at Montrose, in the county of Susquehanna and State of Pennsylvania, have invented certain new and useful Improvements in Automobile Locks; and I do hereby declare the following to be a full, clear, and exact description of the invention, such as will enable others skilled in the art to which it appertains to make and use the same.

This invention relates to automobile locks or means for locking the steering wheel of an automobile so as to prevent the machine from being stolen or used by unauthorized persons when left standing without an attendant.

The object of the invention is to provide a simple, efficient, durable and inexpensive device of the character referred to adapted to be attached to the steering column of an automobile and having means thereon for locking the steering wheel so as to prevent rotary movement thereof.

The invention will first be hereinafter more particularly described, with reference to the accompanying drawings, which are to be taken as a part of this specification, and then pointed out in the claims at the end of the description.

In said drawings:

Fig. 1 is a perspective view of a steering wheel locking device with combination lock embodying my invention applied to the steering column of an automobile;

Fig. 2 is a plan view of the locking device detached;

Fig. 3 is a sectional side elevation of the device taken on the line 3—3 of Fig. 2;

Fig. 4 is a detail sectional view showing the yoke arm locked in its uppermost position for engagement with the steering wheel, and Figs. 5 and 6 are detail views of the sliding locking bolt and a permutation ring or dial, respectively, of the combination lock.

Referring to said drawings, in which the same reference letters are used to denote corresponding parts in different views, the letter A denotes a clamping device composed of two members $a$ and $a^1$ fitting one upon the other and having at one end substantially semi-circular portions $a^2$ and $a^3$ hinged together at $a^4$ and adapted to surround and grip the steering column of a motor vehicle so as to secure the same in a fixed position on the column adjacent the steering wheel. Preferably the confronting surfaces of the parts $a^2$ and $a^3$ are serrated to insure a firm hold on the steering column. The parts $a$ and $a^1$ are provided with one or more, preferably a plurality of registering holes, in which threaded bolts G are screwed, said bolts having their heads countersunk and the metal surrounding the same undercut as indicated in dotted lines in Fig. 2, so that a piece of soft copper or other soft metal may be pressed into the recess thus formed and expanded around the head of the screw so as to conceal the same from view and prevent removal of the screw without first removing the copper or soft metal by drilling or otherwise. The member $a^1$ of the clamp has projecting therefrom an L-shaped arm $a^5$ which is apertured in line with an aperture in the member $a$ to receive a locking bolt C on which are fitted a plurality of permutation rings or dials D having studs or projections $d$ thereon for a purpose hereinafter described.

The sliding locking bolt C has enlarged portions $c$ and $c^1$ and intermediate spaced annular ribs or flanges $c^2$ in which are formed slots in alignment with a slot $c^3$ in the enlarged portion $c^1$ of the bolt, so that when the projections $d$ on all of the dials are brought into alignment with the aligned slots in the annular flanges $c^2$ the locking bolt may be slid endwise in or out, for the purpose of locking or unlocking and releasing the locking arm or yoke I, which is carried by the clamp A for locking the steering wheel. The yoke I has preferably a V-shaped head portion $i$ adapted to straddle a spoke of the steering wheel and prevent rotation thereof when the yoke is secured in its uppermost position, as shown in Figures 1 and 4 of the drawings. The yoke I is slidably fitted in a recess J, in the member $a$ of the clamp and has a plurality of holes therethrough to receive the end $c^4$ of the locking bolt, whereby the yoke may be locked in the raised position, shown in Figure 4, or in its lowermost position, by engagement of the locking bolt with an upper or lower hole in the yoke arm. The locking bolt may have a reduced extension $c^5$ adapted to engage a recess in the rear wall of the recessed portion J, of the clamp member $a$, for greater strength and security, though this extension is not essential and may be dispensed with. Each of the dials D is provided with a plurality of numbers or letters, certain ones of which should be arranged diametrically opposite the projections $d$, so that when the dial is turned to bring such number or letter into a given position, said projection will be in alignment with the slots in the spaced annular ribs and permit longitudinal movement of the locking bolt. In order to lock the bolt the several disks are turned so that the projections thereon will enter the recesses between adjacent ribs $c^2$, out of alignment with the slots in said ribs and thus prevent movement of the locking bolt. The locking bolt C is inserted through the aperture in the arm $a^1$ of the clamp and in the registering aperture in the supporting arm $a^5$, and has a threaded extension $c^6$ projecting beyond said arm $a^5$ to receive a milled head or finger piece F for moving the bolt in and out, and a spring E on said bolt bears against a shoulder within the recessed or apertured member $a$ of the clamp and against a flange or abutment $c^7$ on the locking bolt, so that the latter bolt is normally forced inwardly by action of the spring into locking engagement with the yoke I, but may be withdrawn against the pressure of the spring by pulling outwardly the head portion or finger piece F, and when the bolt is released it will be forced backwardly through one or the other of the holes in the yoke arm so as to lock the latter in either raised or lowered position, for the purpose of locking the steering wheel or releasing the same as may be desired in the operation of the automobile.

It may be desirable in some cases to use a key for locking the sliding bolt C instead of the combination lock or permutation rings and co-operating elements on the locking bolt.

Having thus described my invention, what I claim as new and desire to secure by Letters Patent of the United States, is:—

1. A lock for the steering wheel of an automobile comprising a clamp with means for securing it on the steering column, said clamp comprising opposed members between which said column is clamped, one of said members having an L-shaped apertured arm thereon, and also having an aperture therein in alinement with the aperture in said arm, a bolt slidably fitted in said apertures, a yoke slidably fitted between the opposed members of said clamp substantially at right angles to said sliding bolt, and means positioned between the L-shaped arm and the clamp for engaging the sliding bolt to lock the same in a retracted or extended position for locking or unlocking said yoke.

2. A combination lock for the steering wheel of an automobile comprising a clamp with means for securing it in a fixed position on the steering column, said clamp comprising opposed members between which said column is clamped, one of said members having an L-shaped apertured arm thereon and also having an aperture therein in alinement with the aperture in said arm, a spring projected bolt slidably fitted in said apertures, a yoke slidably fitted between said opposed members of said clamp substantially at right angles to and adapted to be engaged by said sliding bolt to secure the same in a fixed position and a combination lock positioned between the clamp and the apertured L-shaped arm for locking the sliding bolt in a predetermined position.

3. In combination a clamp with concealed means for securing it in a fixed position on the steering column of an automobile, said means comprising bolts having counter-sunk heads and soft metal positioned around said heads and under the counter-sunk portions to conceal the heads of said bolts, an L-shaped apertured arm and an aperture in the clamp in alinement with the aperture in said arm, a spring projected bolt slidably fitted in said apertures, a yoke slidably fitted between opposed members of said clamp substantially at right angles to and adapted to be engaged by said sliding bolt to secure the same in a fixed position and means positioned between the clamp and the apertured L-shaped arm for locking the sliding bolt in a predetermined position.

In testimony whereof I affix my signature in the presence of two witnesses.

GUILLAUME REUSEUS McKEAGE.

Witnesses:
B. F. McKEAGE, Jr.,
C. F. WRIGHTER.